United States Patent

Katayama et al.

[11] Patent Number: 5,699,108
[45] Date of Patent: Dec. 16, 1997

[54] MULTI-EYE IMAGE PICKUP APPARATUS WITH MULTI-FUNCTION FINDER SCREEN AND DISPLAY

[75] Inventors: Tatsushi Katayama, Tokyo; Nobuo Fukushima, Yokohama; Masayoshi Sekine, Tokyo, all of Japan

[73] Assignee: Canon Kabushiki Kaisha, Tokyo, Japan

[21] Appl. No.: 623,740

[22] Filed: Mar. 29, 1996

Related U.S. Application Data

[63] Continuation of Ser. No. 298,049, Aug. 30, 1994, abandoned.

[30] Foreign Application Priority Data

Sep. 1, 1993 [JP] Japan ................. 5-217390

[51] Int. Cl.⁶ ............................................. H04N 13/02
[52] U.S. Cl. ............................................. 348/47; 348/334
[58] Field of Search ........................ 348/36, 42, 46, 348/47, 49, 50, 333, 334, 340

[56] References Cited

U.S. PATENT DOCUMENTS

| | | | |
|---|---|---|---|
| 4,734,772 | 3/1988 | Akiyama | 348/340 |
| 4,751,570 | 6/1988 | Robinson | 348/47 |
| 4,791,478 | 12/1988 | Tredwell et al. | 348/42 |
| 5,138,460 | 8/1992 | Egawa | 348/333 |
| 5,175,616 | 12/1992 | Milgram et al. | 348/47 |
| 5,488,414 | 1/1996 | Hirasawa et al. | 348/334 |

FOREIGN PATENT DOCUMENTS

| | | | |
|---|---|---|---|
| 63-287287 | 11/1988 | Japan | H04N 13/00 |
| 64-86129 | 3/1989 | Japan | |

*Primary Examiner*—Wendy Garber
*Attorney, Agent, or Firm*—Morgan & Finnegan, LLP

[57] ABSTRACT

In a stereoscopic image pick-up mode and an aspect ratio change/panoramic image pick-up mode by a multi-eye image pick-up apparatus, information is displayed such that a photographer can intuitively grasp various image pick-up conditions.

A multi-eye image pick-up apparatus having a plurality of image pick-up optical systems includes an operation processing portion for receiving signals of position information obtained by an encoder and a rotational angle encoder provided to each image pick-up optical system, and a slide mechanism to calculate the image pick-up conditions and the display position of a figure representing the image pick-up state to be displayed in a finder, and a finder screen image producing portion for producing, from a calculation result, a video signal to be displayed in the finder.

19 Claims, 20 Drawing Sheets

MULTI-EYE IMAGE PICKUP APPARATUS WITH MULTI-FUNCTION FINDER SCREEN AND DISPLAY

This is a continuation of application Ser. No. 08/298,049, filed on Aug. 30, 1994 now abandoned.

BACKGROUND OF THE INVENTION

1. Field of the Invention

The present invention relates to an image pick-up apparatus and, more particularly, to a multi-eye image pick-up apparatus such as a television or video camera system which can pick up an image using a plurality of image pick-up optical systems to provide a stereoscopic image or an image having an arbitrary aspect ratio.

2. Related Background Art

A conventional method of informing a photographer of the image pick-up state of cameras in a multi-eye image pick-up system is disclosed in, e.g., Japanese Patent Laid-Open Application No. 64-86129. According to this method, the convergence angle between the two cameras of a stereoscopic image pick-up apparatus is displayed. When the convergence angle is inappropriate to pick up a stereoscopic image, an alarm device constituted by a buzzer or a lamp generates an alarm to prevent a failure in the image pick-up operation.

SUMMARY OF THE INVENTION

However, since the above-described prior art has as its main object to inform whether or not the convergence angle is appropriate to pick up a stereoscopic image, it fails to provide sufficient information as to the image pick-up state. In addition, the above prior art is directed to only the stereoscopic image pick-up operation and does not refer to informing of the image pick-up state in an aspect ratio change/panoramic image pick-up mode. However, in the aspect ratio change/panoramic image pick-up mode, the aspect ratio is adjusted by controlling the vergence. For this reason, a desired image can hardly be obtained without determining the vergence state in the image pick-up operation. In-focus and photometric regions in the stereoscopic image pick-up mode and the aspect ratio change/panoramic image pick-up mode must also be displayed.

The present invention has been made in consideration of the above problems, and has as its object to provide a multi-eye image pick-up apparatus which allows a photographer to pick up an image while constantly grasping a necessary image pick-up state in a stereoscopic image pick-up mode and an aspect ratio change/panoramic image pick-up mode.

According to the present invention, there is provided a multi-eye image pick-up apparatus having a plurality of image pick-up optical systems, comprising a plurality of detecting means respectively provided to the image pick-up optical systems, finder screen image producing means for producing, on the basis of a detection signal from the detecting means, a video signal of an image pick-up condition to be displayed, and display means for displaying the produced video signal of the image pick-up condition together with image information. In this apparatus, each image pick-up optical system has one finder screen image producing means and one display means, and the display content of the image pick-up condition is set and input by external setting means.

Detection signals are input from focusing, zooming, and rotational angle encoders provided to each image pick-up optical system, and a position detecting means provided to a slide mechanism. A microcomputer calculates a distance to an object, a base line length, a convergence angle, an overlapping region, the display positions of an in-focus portion and a figure which represents an image pick-up state, and the like. These image pick-up conditions and state are displayed in a finder together with image information.

DETAILED DESCRIPTION OF THE PREFERRED EMBODIMENTS

The arrangement of a multi-eye image pick-up system according to the first embodiment of the present invention will be described with reference to FIG. 1.

Figure 1:
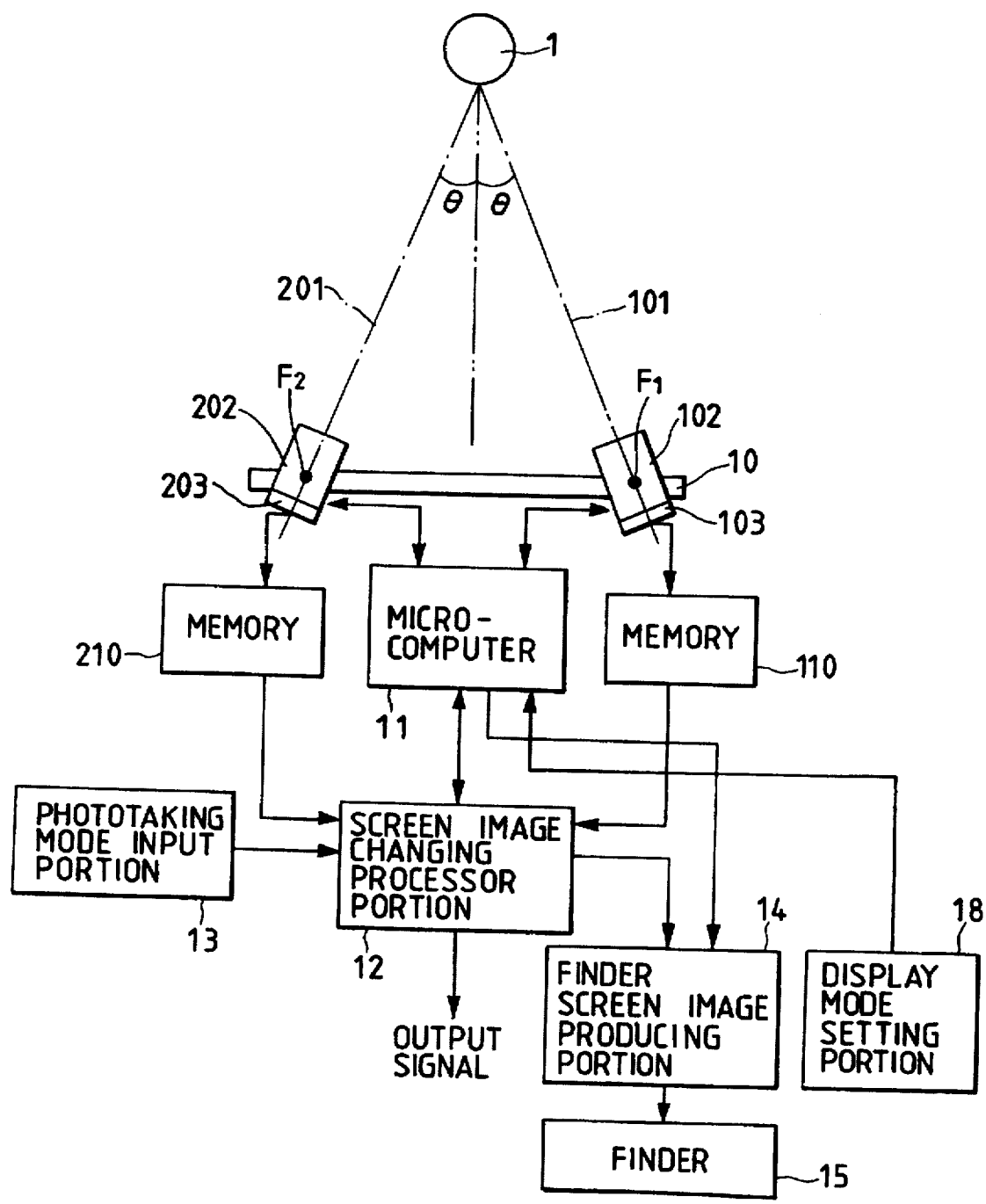
FIG. 1 is a schematic view showing a multi-eye image pick-up system according to the first embodiment of the present invention.

Referring to FIG. 1, a first object 1 is located in front of first and second image pick-up optical systems 102 and 202 having equivalent specifications and generally comprising zooming lenses. Image sensors 103 and 203 similarly have equivalent specifications and comprise pick-up tubes such as saticon or solid-state image pick-up elements such as a CCD. (Although, for illustrative convenience, a single-plate type (or single-tube type) is schematically shown in FIG. 1, a two-plate type (two-tube type) or three-plate type (three-tube type) through a color separation optical system may also be used.)

The image pick-up optical systems 102 and 202 can be horizontally moved by a slide mechanism 10. With this operation, the base line length connecting rotation centers $F_1$ and $F_2$ of the two image pick-up optical systems is adjusted. Optical axes 101 and 201 of the image pick-up optical systems 102 and 202 cross each other on the first object 1 and are inclined at angles $\theta$ with respect to the perpendicular bisector of the base line connecting the rotation centers $F_1$ and $F_2$ of the image pick-up optical systems. The angles $\theta$ are controlled to be constantly equal to each other. The convergence angle is defined as $2\theta$, and the convergence angle is changed in accordance with a change in distance to the object, thereby performing an image pick-up operation. When the convergence angle is changed, the overlapping region between the two optical systems changes accordingly. Using this phenomenon, a stereoscopic image or an image having an arbitrary aspect ratio is picked up. A microcomputer 11 controls the entire multi-eye image pick-up apparatus. Image memories 110 and 210 temporarily store video signals input from the image pick-up optical systems 102 and 202, respectively. A phototaking mode input portion 13 detects that a photographer is to pick up a stereoscopic image, an image having an arbitrary aspect ratio, or a panoramic image, and inputs the detected mode to a screen image changing processor portion 12. The screen image changing processor portion 12 changes and processes an image on the basis of the video signals in the image memories 110 and 210 and a signal related to the image pick-up state of each image pick-up optical system obtained by the microcomputer 11 in accordance with a predetermined image pick-up mode, thereby producing a video signal converted for a stereoscopic image pick-up mode or an aspect ratio change mode. A finder screen image producing portion 14 produces a video signal to be displayed in a finder 15 on the basis of the converted and processed image and the signal related to the image pick-up state obtained by the microcomputer 11. A display mode setting portion 18 sets the type of information of the image pick-up state to be displayed in the finder 15. If the photographer does not set any specific mode, predetermined information is displayed as an initial mode.

The arrangements and functions of the image pick-up optical systems 102 and 202 of the multi-eye image pick-up system according to the first embodiment of the present invention will be described below with reference to FIG. 2.

Figure 2:
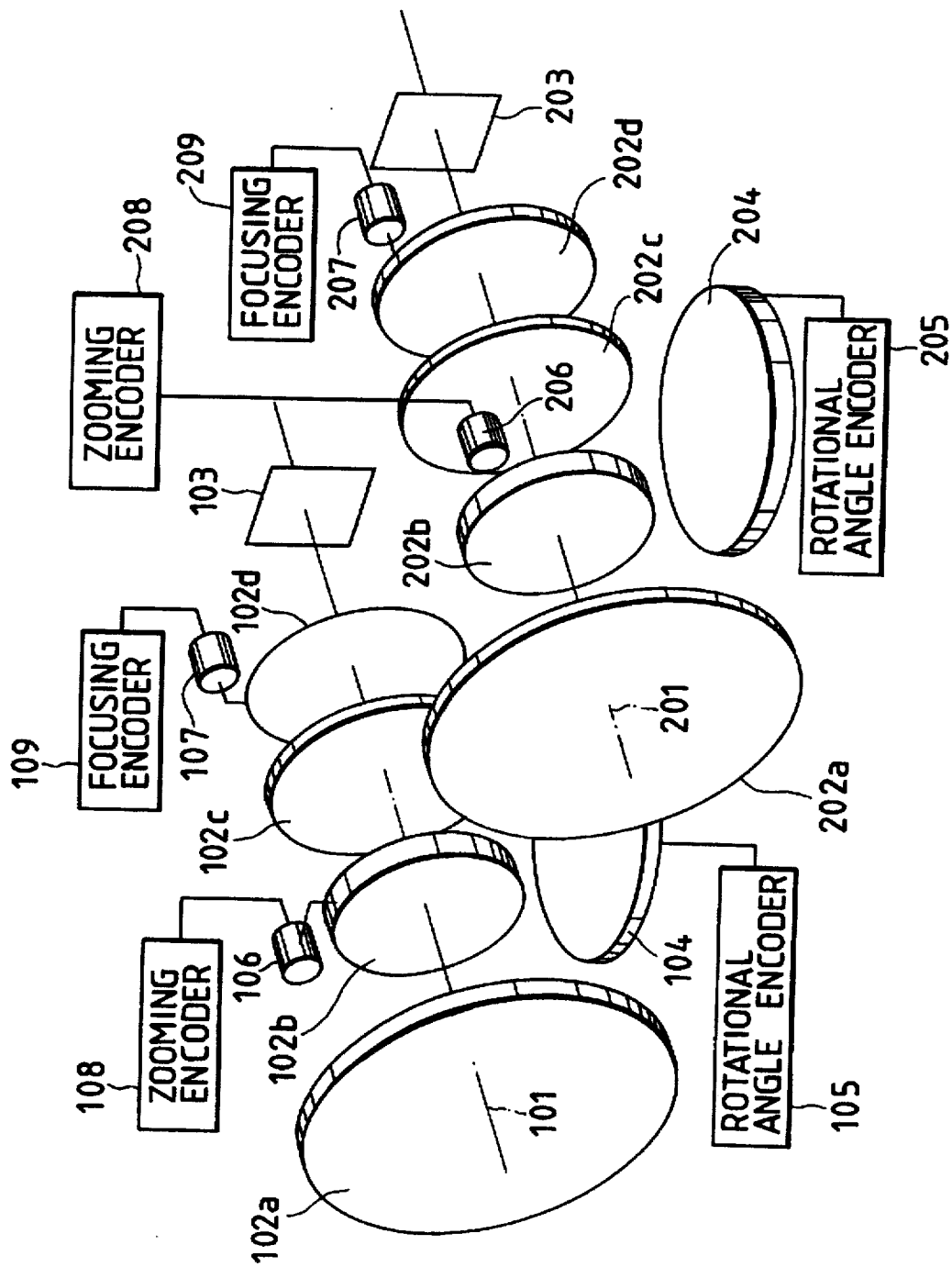
FIG. 2 is a view showing the basic arrangement of a multi-eye image pick-up optical system according to the present invention.

Referring to FIG. 2, lens groups 102a, 102b, 102c, and 102d and 202a, 202b, 202c, and 202d constitute the first and second image pick-up optical systems 102 and 202, respectively. Of these lens groups, the lens groups 102b and 202b are variable magnification lens groups, and the lens groups 102d and 202d are focusing lens groups. Drive systems (zooming motors) 106 and 206 drive the variable magnification lens groups 102b and 202b, respectively. Drive systems (focusing motors) 107 and 207 drive the focusing lens groups 102d and 202d, respectively. The first image pick-up optical system 102 and the image sensor 103, and the second image pick-up optical system 202 and the image sensor 203 are integrally formed, respectively. A mechanism system (not shown) rotating in a plane substantially including the optical axes 101 and 201, and drive systems (convergence angle motors) 104 and 204 are provided. Each of rotational angle encoders 105 and 205 may be constituted by an external member such as a rotary encoder, or a drive system such as a pulse motor capable of obtaining angle information by itself by its driving method. The convergence angle is obtained from these signals. Encoders (zooming encoders) 108 and 208 are used to obtain the position information, of the lens groups provided to the variable magnification lens groups 102b and 202b of the image pick-up optical systems, along the optical axes, respectively. A focal distance f of the image pick-up optical system 102 or 202 can be obtained from a signal from the zooming encoder 108 or 208.

Encoders (focusing encoders) 109 and 209 are used to obtain the position information, of the lens group provided to the focusing lens groups 102d and 202d of the image pick-up optical systems, along the optical axes, respectively. Each encoder may be constituted by an external member such as a potentiometer, or a drive system such as a pulse motor capable of obtaining the position information of the lens along the optical axis by itself by its driving method.

The encoder (zooming encoder) 108 is provided to the variable magnification lens group 102b of the image pick-up optical system in FIG. 2 to obtain the position information of the lens groups along the optical axis in advance. The focal distance f of the image pick-up optical system 102 is obtained from a signal from this encoder. Similarly, the encoder (zooming encoder) 109 is provided to the focusing lens group 102d of the image pick-up optical system to obtain the position information of the lens group along the optical axis. A focusing magnification $\beta$ of the image pick-up optical system 102 is obtained in accordance with a signal from the zooming encoder 108. The image pick-up optical system 202 has the same arrangement and function as those of the image pick-up optical system 102.

The control microcomputer 11 separately controls the drive systems 106, 107, 206, and 207 in accordance with signals from the encoders 108, 109, 208, and 209. With this operation, the focal distance f and the focusing magnification $\beta$ of the image pick-up optical system 102 are always matched with those of the image pick-up optical system 202.

A screen image to be displayed in the finder 15 of the multi-eye image pick-up apparatus having the above arrangement and the function of the finder screen image producing portion 14 will be described below with reference to FIGS. 3A to 5B.

Figure 3A:
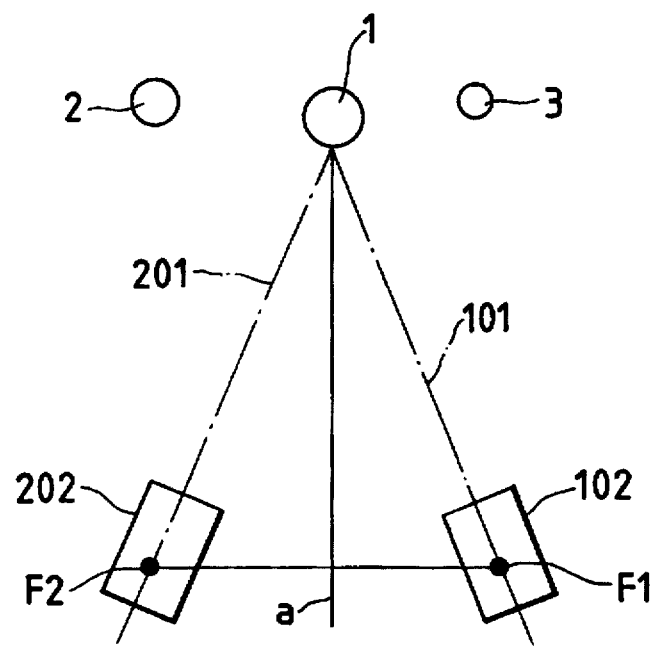
FIGS. 3A and 3B are views showing image pick-up conditions in a stereoscopic image pick-up mode and a screen image displayed in a finder, respectively.
Figure 3B:
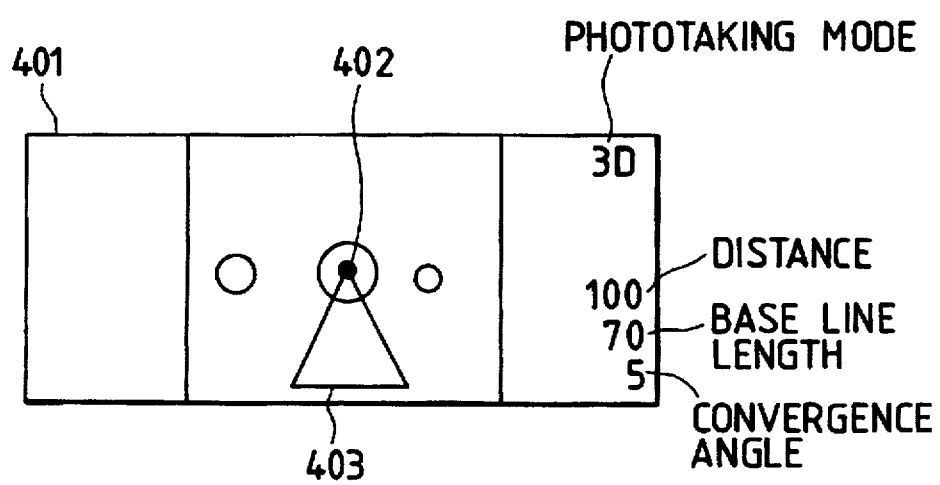
Figure 4A:
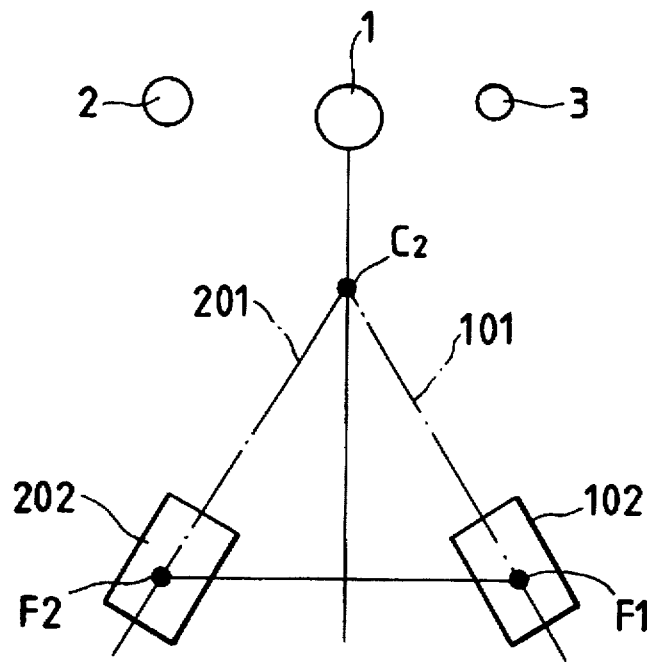
FIGS. 4A and 4B are views showing image pick-up conditions in the stereoscopic image pick-up mode and a screen image displayed in the finder, respectively.
Figure 4B:
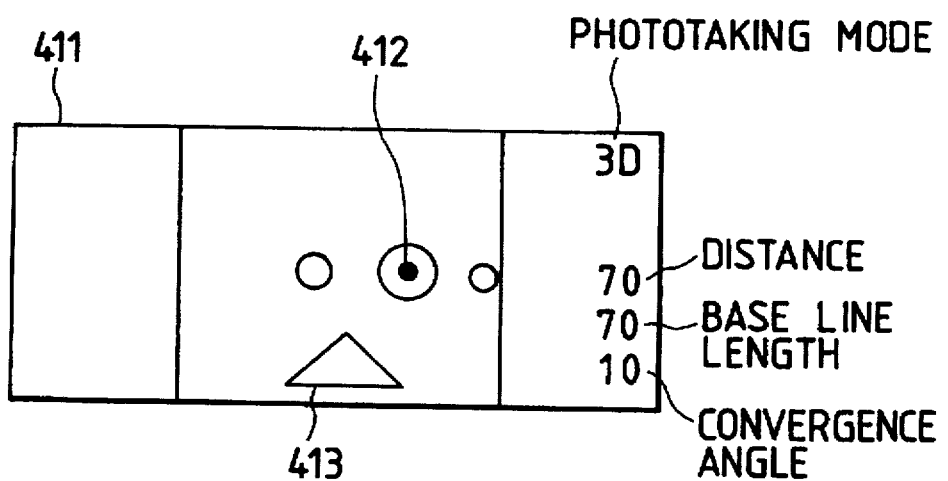
Figure 5A:
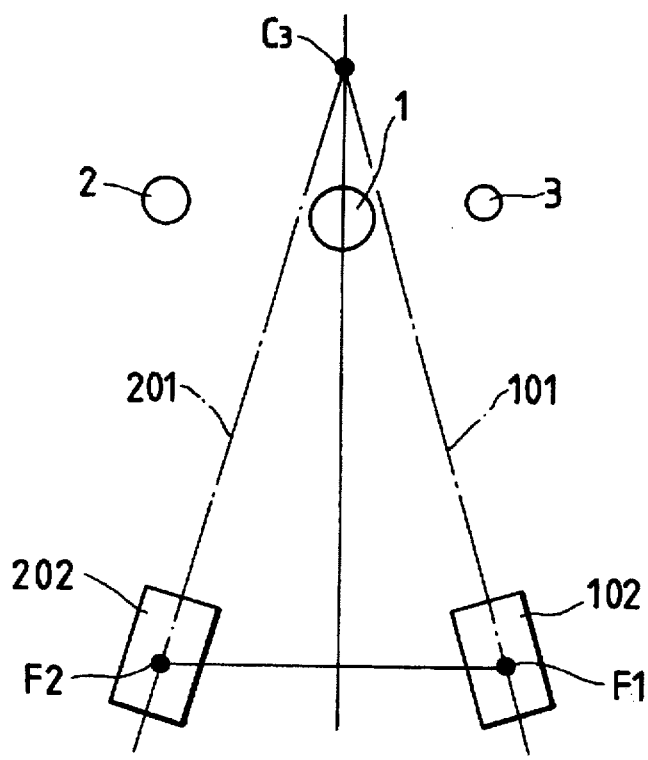
FIGS. 5A and 5B are views showing image pick-up conditions in the stereoscopic image pick-up mode and a screen image displayed in a finder, respectively.
Figure 5B:
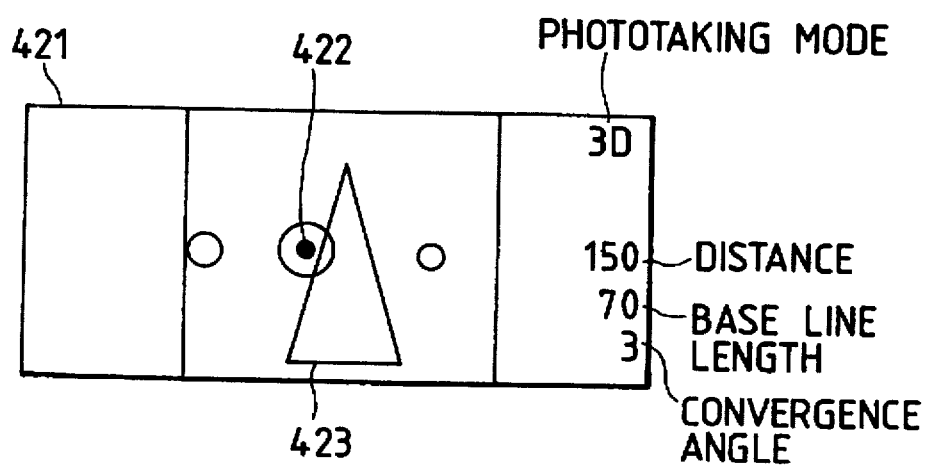

FIGS. 3A, 4A, and 5A are schematic views showing arrangements of objects and the like in the stereoscopic image pick-up mode of the multi-eye image pick-up apparatus. FIGS. 3B, 4B, and 5B are schematic views showing screen images displayed in the finder in these arrangements. For descriptive convenience, a case will be described in which an image obtained by the image pick-up optical system 102 is displayed in the finder.

FIGS. 3B, 4B, and 5B are views showing a case in which when a finder commonly used in both the stereoscopic image pick-up mode and the aspect ratio change/panoramic image pick-up mode is used, and the aspect ratio of the image sensor 103 or 203 is, e.g., 4:3, the aspect ratio of the finder is 8:3 which corresponds to the aspect ratio in the panoramic image pick-up mode.

When the power supply is turned on, as shown in FIG. 3A, the convergence angle is controlled such that an observer gazes at the object located on a perpendicular bisector a to the base line connecting the rotation centers $F_1$ and $F_2$ of the image pick-up optical systems 102 and 202. A screen image 401 displayed in the finder 15 at this time is shown in FIG. 3B. As shown in FIG. 3B, the base line length, the convergence angle, the distance to the gazing point, and the like in the image pick-up mode are displayed in the finder. At the same time, a figure 403 geometrically representing the image pick-up state is displayed. In the initial state, the FIG. 403 is an isosceles triangle having an apex at the gazing point, as shown in the screen image 401. The object 1 located on the perpendicular bisector a is the main object, and a marker 402 is displayed on the screen image 401.

When the photographer operates the apparatus such that the optical axes 101 and 201 cross each other at a point $C_2$ in front of the object 1, as shown in FIG. 4A, the screen image in the finder, which represents an image of the image pick-up optical system 102, becomes as shown in FIG. 4B. The base line length, the convergence angle, the distance, and the like change in accordance with a change in image pick-up state, as shown in FIG. 4B. At the same time, in a FIG. 413 representing the image pick-up state, the position of the apex changes, as shown in FIG. 4B.

When the photographer operates the apparatus such that the optical axes 101 and 201 cross each other at a point $C_3$ behind the object 1, as shown in FIG. 5A, the position of the apex of a FIG. 423 moves to the upper side of the screen, as shown in FIG. 5B.

The finder screen image producing portion 14 produces and displays a finder screen image shown in FIG. 3B, 4B, or 5B on the basis of a video signal obtained from the screen image changing processor portion 12 and parameters obtained from the microcomputer 11 in the image pick-up mode. When specific to-be-displayed information is set by the display mode setting portion 18, only such information set by the microcomputer 11 can be displayed.

As described above, since the photographer can operate the apparatus while grasping the current image pick-up state, an image desired by the photographer can be produced. In addition, since the current image pick-up state is displayed as a figure, the image pick-up condition can be intuitively grasped, so the operability is greatly improved.

Figure 6:
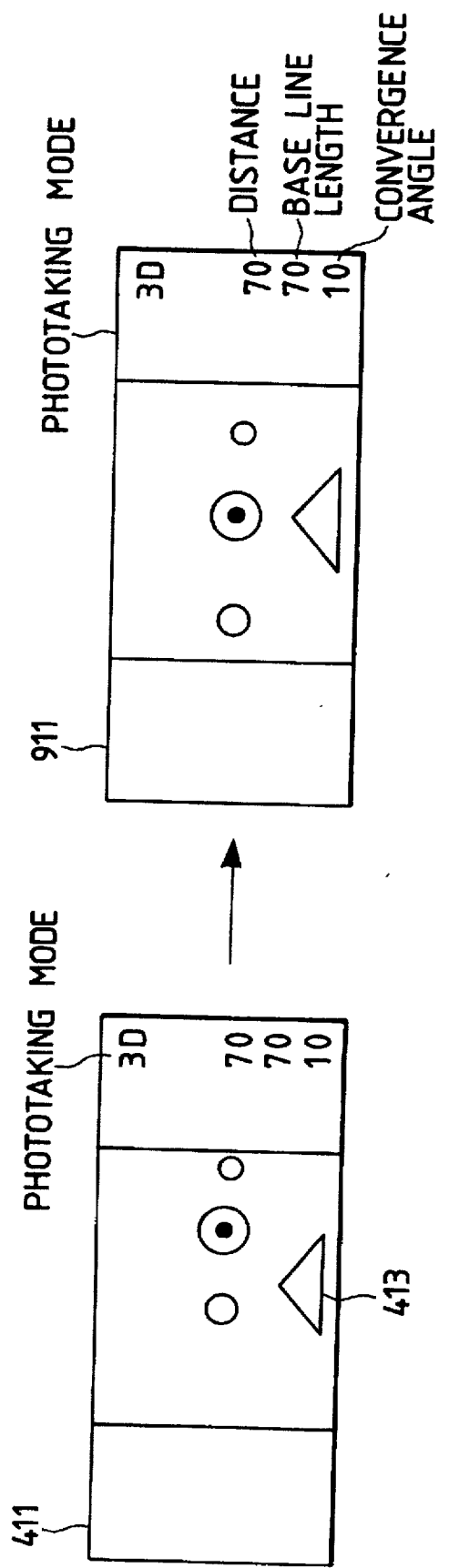
FIG. 6 is a view showing a screen image displayed in the finder.

A case has been described above in which an image obtained by the image pick-up optical system 102 is displayed in the finder 15. However, the same description applies to a case in which an image obtained by the image pick-up optical system 202 is displayed. An image to be displayed may be switched using a switch (not shown). The position information of the object may be obtained in accordance with the principle of triangulation, and, as shown in FIG. 6, a screen image 411 obtained in FIG. 4A may be changed to, e.g., an image picked up from the front (direction of the perpendicular bisector a) and displayed as a display screen image 911.

Figure 7A:
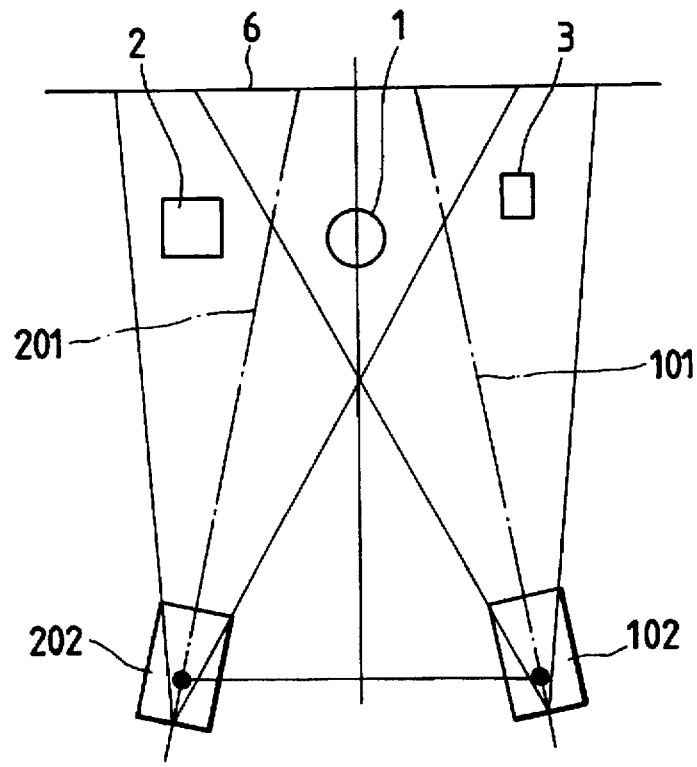
FIGS. 7A and 7B are views showing image pick-up conditions in an aspect ratio change image pick-up mode and a screen image displayed in the finder, respectively.
Figure 7B:
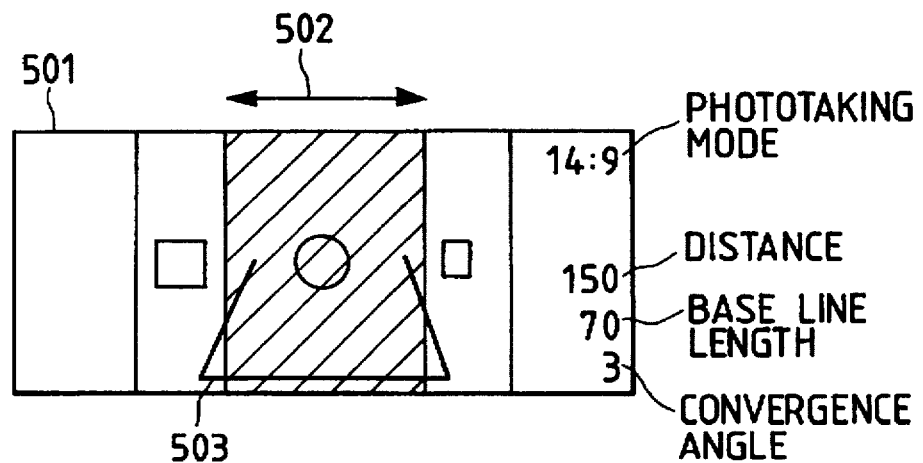
Figure 8A:
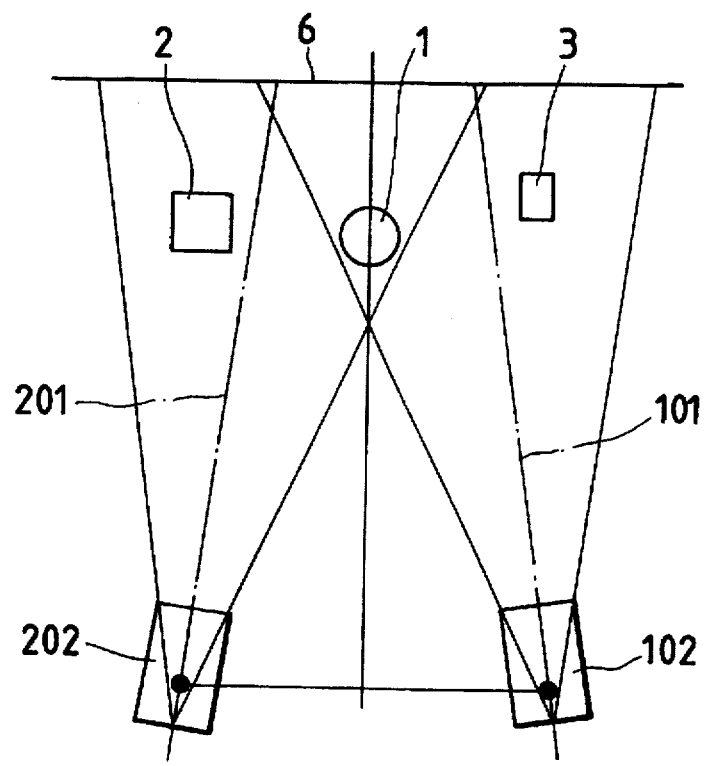
FIGS. 8A and 8B are views showing image pick-up conditions in the aspect ratio change image pick-up mode and a screen image displayed in the finder, respectively.
Figure 8B:
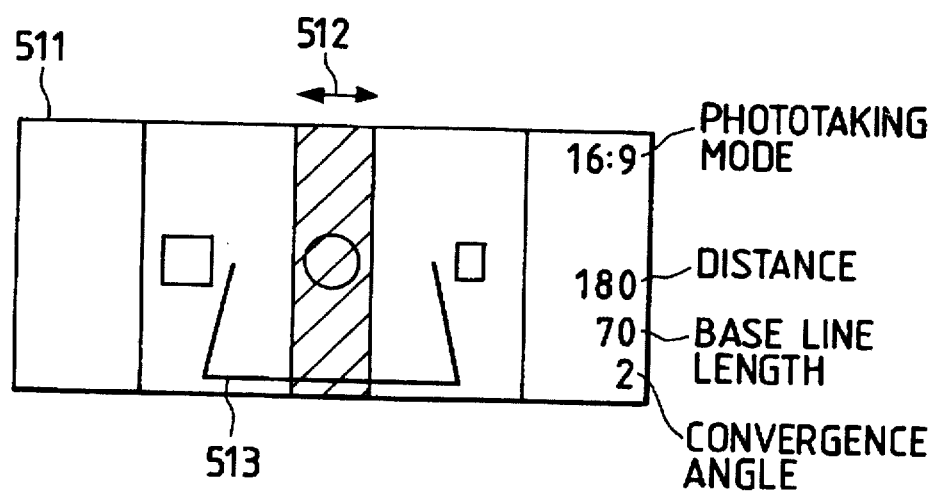
Figure 9A:
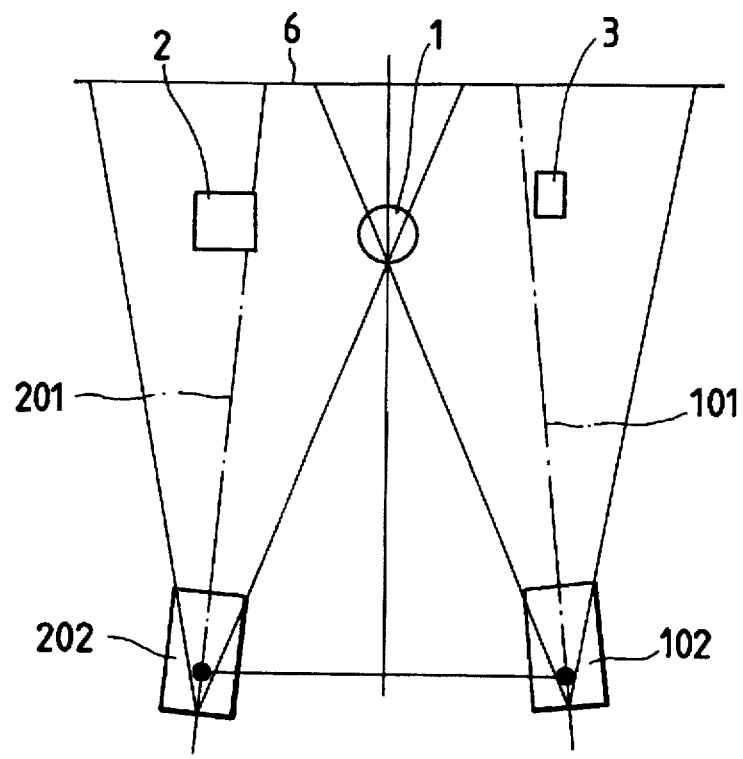
FIGS. 9A and 9B are views showing image pick-up conditions in a panoramic image pick-up mode and a screen image displayed in the finder, respectively.
Figure 9B:
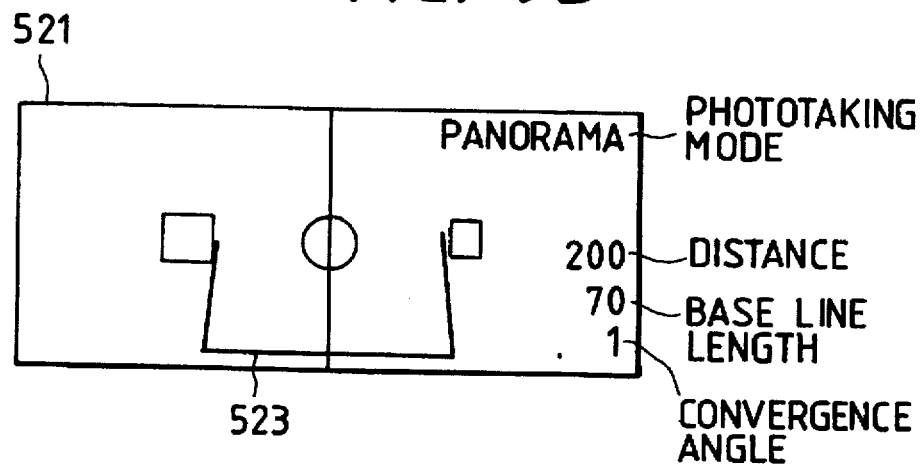

A display screen image in the finder in the aspect ratio change/panoramic image pick-up mode will be described below. FIGS. 7A, 8A, and 9A are schematic views showing arrangements of objects and the like in the aspect ratio change/panoramic image pick-up mode of the multi-eye image pick-up apparatus. FIGS. 7B, 8B, and 9B are schematic views showing screen images in the finder 15 in these arrangements.

As shown in FIGS. 7A, 8A, and 9A, the image of objects 1, 2, and 3 located in front of a background 6 is picked up by the multi-eye image pick-up system. At this time, by controlling the convergence angle, an overlapping region 502 in each image pick-up system is changed, thereby producing an image having an arbitrary aspect ratio. FIG. 7B, 8B, or 9B shows an image displayed in the finder 15 when the image is picked up in the arrangement in FIG. 7A, 8A, or 9A. Also in this case, conditions in the image pick-up mode, i.e., the convergence angle, the base line length, the distance, and the like are simultaneously displayed as in the above-described stereoscopic image pick-up mode. In the aspect ratio change image pick-up mode, the aspect ratio during the image pick-up operation is displayed at the upper right corner, as shown in FIG. 7B.

A FIG. 503 representing the image pick-up state is simultaneously displayed. As the state in FIG. 7A changes to a state in FIG. 8A, a FIG. 501 in FIG. 7B changes to a FIG. 513 in FIG. 8B. For this reason, the photographer can operate the apparatus while intuitively recognizing the current vergence state, the distance to the object, the aspect ratio, and the like.

FIG. 9A is a view showing the arrangement in the panoramic image pick-up mode. The display in the finder changes as shown in FIG. 9B. As a display related to the image pick-up mode, "panorama" is displayed at the upper right corner as shown in FIG. 9B.

As shown in FIGS. 7B and 8B, when the overlapping region in each image pick-up system is emphasized and displayed as a crosshatched portion, the overlapping regions 502 and 512 in the screens can be also recognized. The overlapping region includes corresponding points between the images obtained by the image pick-up systems. For this reason, on the basis of the information of the corresponding points and the image pick-up conditions, the distance information of the object located in the overlapping region can be calculated in accordance with the principle of triangulation. Therefore, when a mode for displaying the distance in the screen is input as an image pick-up mode, the distance information related to the object in the overlapping region can be displayed in the finder. That is, the photographer can recognize not only the image information but also the depth information related to the object during the image pick-up operation. With this operation, the photographer can obtain the information of the arrangement of objects and depth of the field, determine the stereoscopic or panoramic image pick-up mode in accordance with the obtained information, and recognize the image in the finder. At the same time, the photographer can change the image pick-up conditions. For this reason, the system operability and the quality of an image to be picked up can be largely improved.

As for the image in the finder 15 in FIG. 3B, 4B, 5B, 7B, 8B, or 9B, the image pick-up mode, the image pick-up conditions, and the figure representing the image pick-up state need not always be displayed to overlap the image. Instead, they may be displayed as needed in accordance with a signal from an input means (not shown) and a control signal from the microcomputer 11.

The photographer can pick up an image while recognizing the image pick-up conditions. For this reason, for example, when an image to be reproduced in a wide monitor having an aspect ratio of 16:9 is to be produced, the aspect ratio can be fixed at 16:9 by a signal (not shown), and an image can be picked up under a predetermined condition.

Calculation performed by the microcomputer 11 and a signal transmitted to the finder screen image producing portion 14 to display the image pick-up conditions in the finder will be schematically described below.

The microcomputer 11 receives signals from the focusing encoders 109 and 209, the zooming encoders 108 and 208, and the rotational angle encoders 105 and 205 of the image pick-up optical systems 102 and 202, and position information detecting means (not shown) of the image pick-up optical systems 102 and 202, which are attached to the slide mechanism 101, to perform control.

The microcomputer 11 also calculates the image pick-up conditions to be displayed in the finder. Rotational signals $\theta_{(L)}$ and $\theta_{(R)}$ obtained by the rotational angle encoders 105 and 205 are added to calculate the convergence angle $2\theta$ which is given by $2\theta=\theta_{(L)}+\theta_{(R)}$. As for the base line length, for example, distances $L_L$ and $L_R$ of the image pick-up optical systems 102 and 202 from an origin O are input by the position information detecting means of the slide mechanism 10, thereby calculating a base line length L which is given by $L=L_L+L_R$. A distance T from the origin O to the gazing point in FIG. 1 is given by $T=(L/2)/(\tan\theta)$.

To display the FIG. 403 representing the image pick-up state, as shown in FIG. 3B, the position of the apex of the FIG. 403 on the display screen image 401 is calculated on the basis of the information of the base line length, the convergence angle, and the like.

As described above, the microcomputer 11 receives the signals of the position information obtained by the encoders, the rotational angle encoders, and the slide mechanism of the image pick-up optical systems 102 and 202, calculates the image pick-up conditions and the display positions of the figure representing the image pick-up state to be displayed in the finder 15, and outputs the calculation results to the finder screen image producing portion 14.

Figure 10:
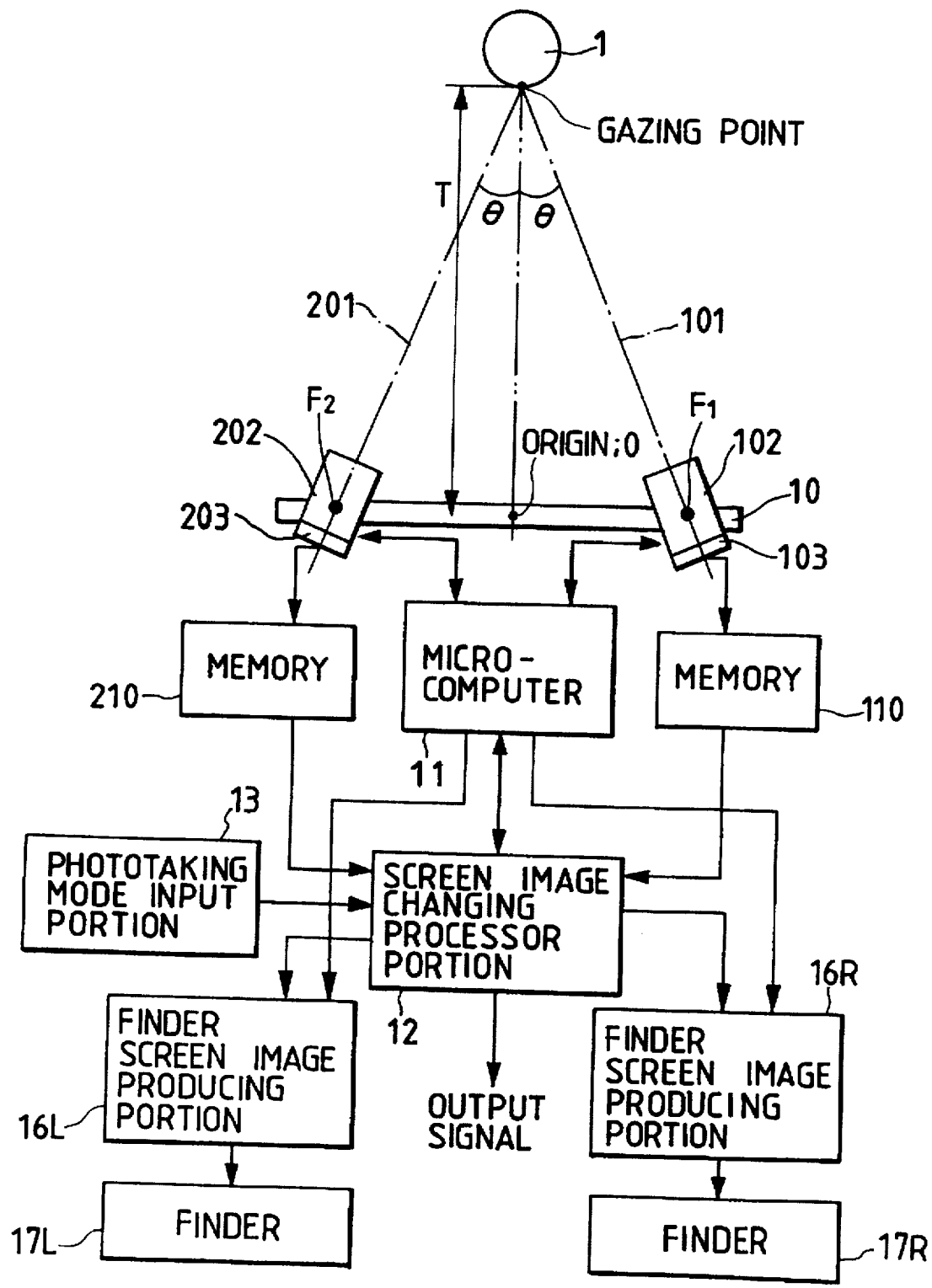
FIG. 10 is a schematic view showing a multi-eye image pick-up system according to the second embodiment of the present invention.

The second embodiment of the present invention will be described below with reference to FIG. 10. The same reference numerals and symbols as in the first embodiment denote the same portions, and a detailed description thereof will be omitted.

This embodiment is different from the first embodiment in that a multi-eye finder is used. As shown in FIG. 10, finder screen image producing portions 16L and 16R respectively produce video signals to be output to finders 17L and 17R on the basis of images obtained by image pick-up optical systems 102 and 202 and image pick-up condition signals obtained by a microcomputer 11.

Figure 11A:
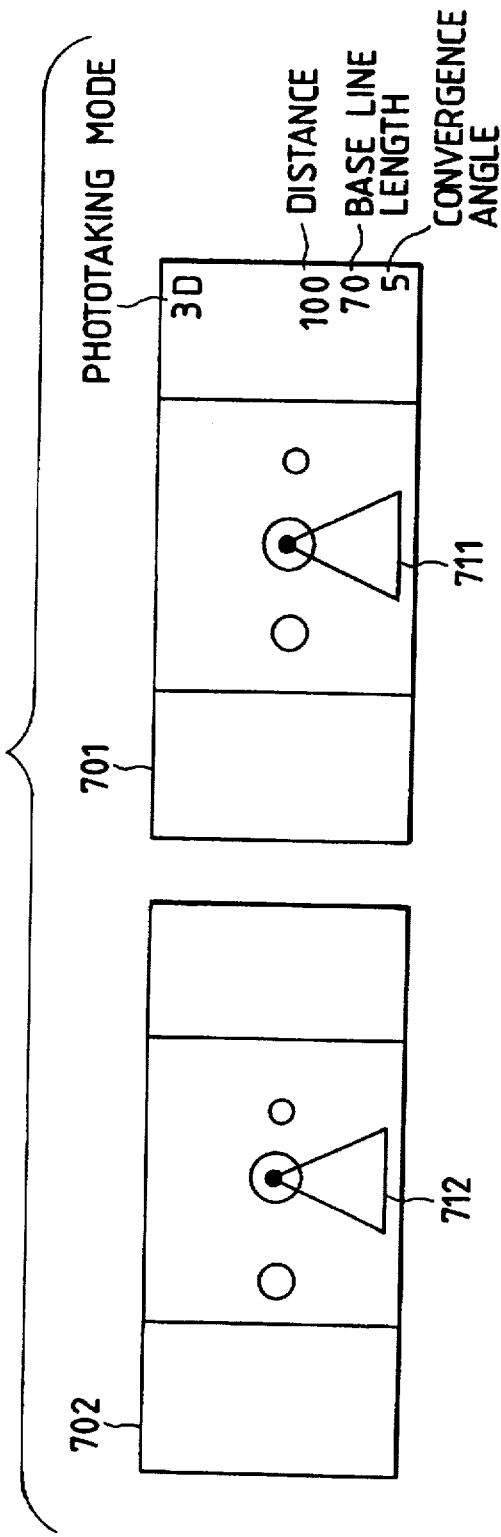
FIGS. 11A and 11B are a view showing screen images displayed in a multi-eye finder and a schematic view showing the multi-eye finder, respectively.
Figure 11B:
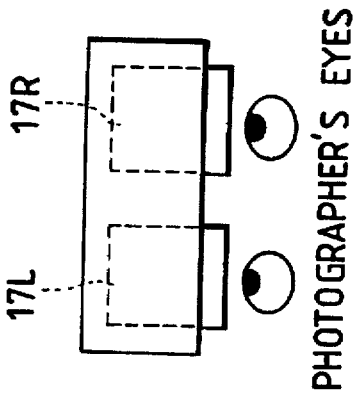

FIGS. 11A and 11B are schematic views showing a video signal displayed in the finder of the second embodiment. When the image of an object is picked up in the arrangement shown in FIG. 3A, images displayed in the finders 17L and 17R can be represented as in FIG. 11A. An image 702 of the image pick-up optical system 202 is displayed in the finder 17L while an image 701 of the image pick-up optical system 102 is displayed in the finder 17R. At this time, signals related to the image pick-up conditions obtained by the microcomputer 11 are simultaneously displayed, e.g., at the right corner of the screen 701. As in the first embodiment, FIGS. 711 and 712 representing image pick-up states are displayed together with the video signals. Therefore, a photographer can intuitively grasp the image pick-up state.

Figure 12:
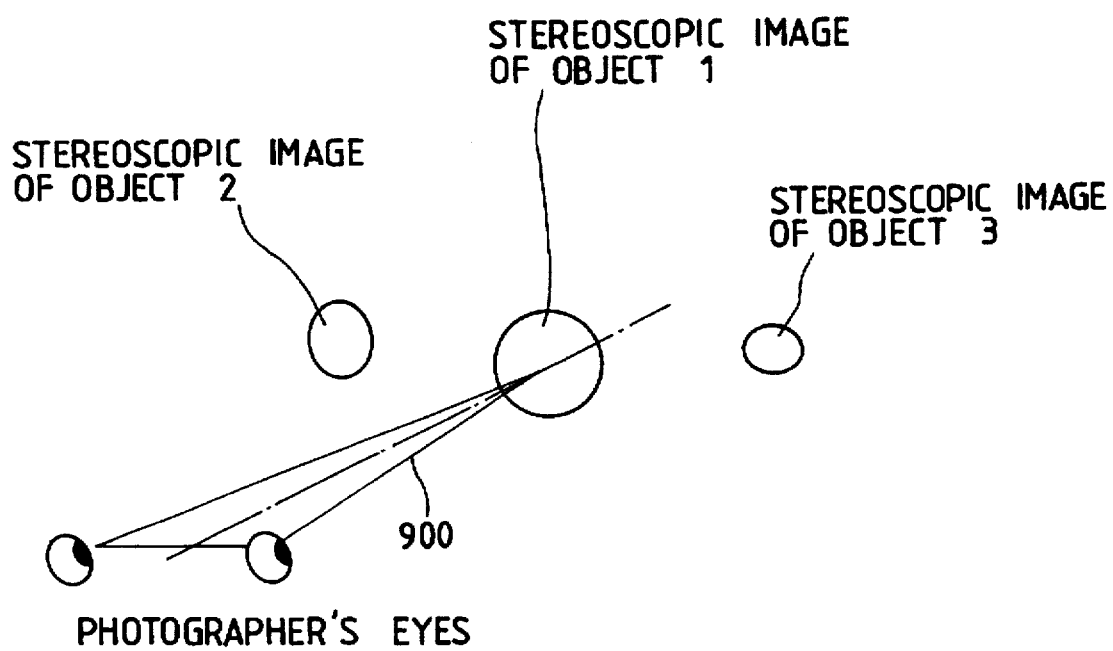
FIG. 12 is an explanatory view of a stereoscopic image produced during observation of the multi-eye finder.

When the multi-eye finder is used, the photographer picks up the image while stereoscopically observing the object, as shown in FIG. 11B. More specifically, the photographer can set conditions for obtaining an optimal stereoscopic image while recognizing an object 1, a stereoscopic FIG. 900 corresponding to the FIGS. 711 and 712 representing the image pick-up state in FIG. 11A, and the image pick-up conditions such as a convergence angle, a distance, and a base line length, and the like displayed in the finder 17R as shown in FIG. 12.

Also in the aspect ratio change/panoramic mode, when an aspect ratio changed image and a panoramic image are displayed in the finder together with the image pick-up conditions, the photographer can pick up an image while grasping optimal image pick-up conditions.

In this embodiment, the image pick-up conditions are displayed in only one finder. However, the image pick-up conditions may be displayed in both the finders, as a matter of course.

Figure 13:
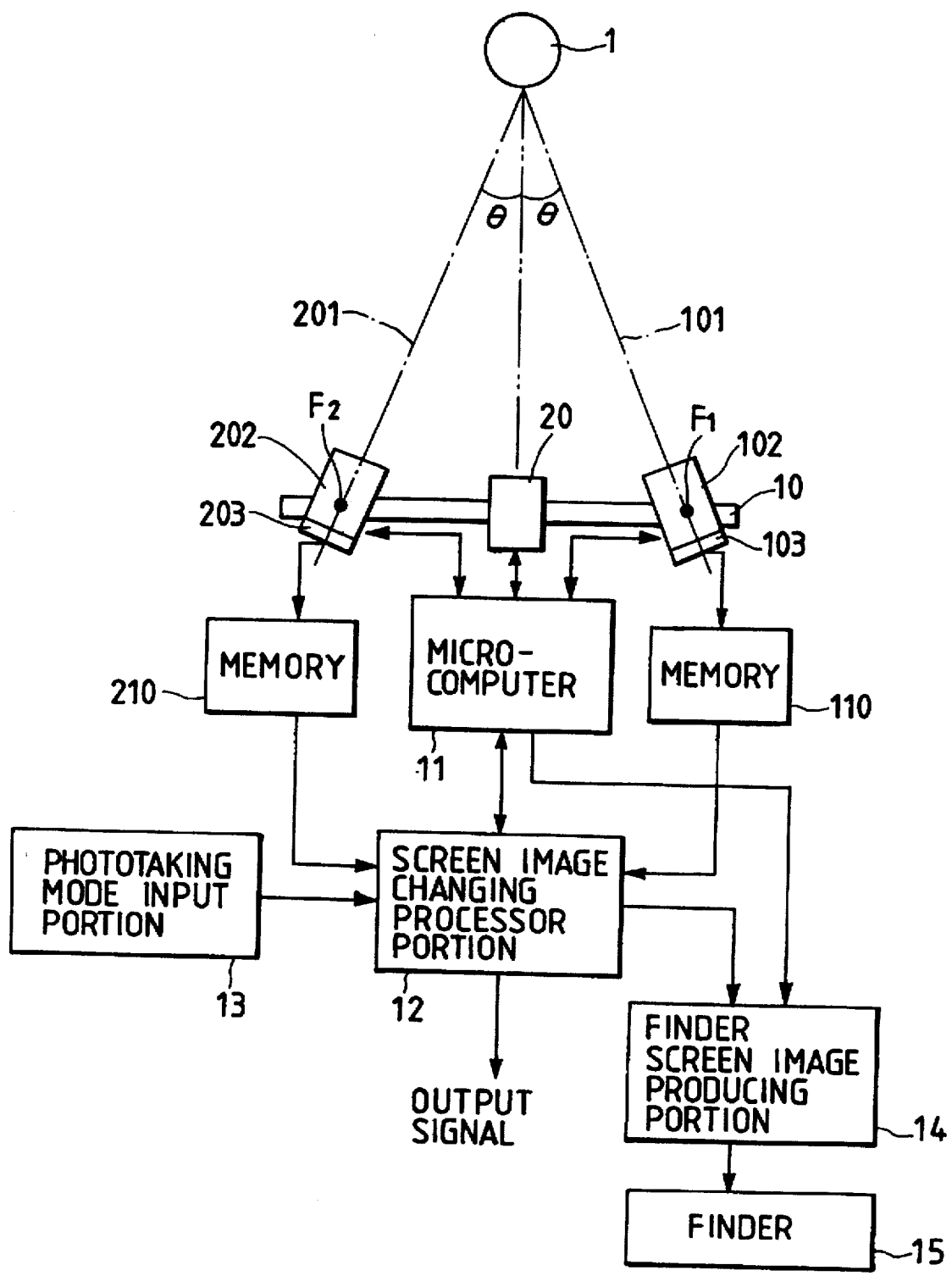
FIG. 13 is a schematic view showing a multi-eye image pick-up system according to the third embodiment of the present invention.

The third embodiment of the present invention will be described below with reference to FIG. 13. FIG. 13 is a schematic view showing a case in which autofocusing and autophotometry are performed in a multi-eye image pick-up apparatus according to the present invention. The same reference numerals and symbols as in the above embodiments denote the same portions, and a detailed description thereof will be omitted. Referring to FIG. 13, a distance measuring means 20 measures a distance from the multi-eye image pick-up system to an object. For example, the distance measuring means 20 is arranged on the perpendicular bisector to a base line length to measure a distance to an object 1 located on the perpendicular bisector. The information of the measured distance to the object 1 is output to a microcomputer 11.

The object distance information obtained by the distance measuring means 20 and setting of an in-focus object plane in each image pick-up optical system will be briefly described below with reference to FIG. 14.

Figure 14:
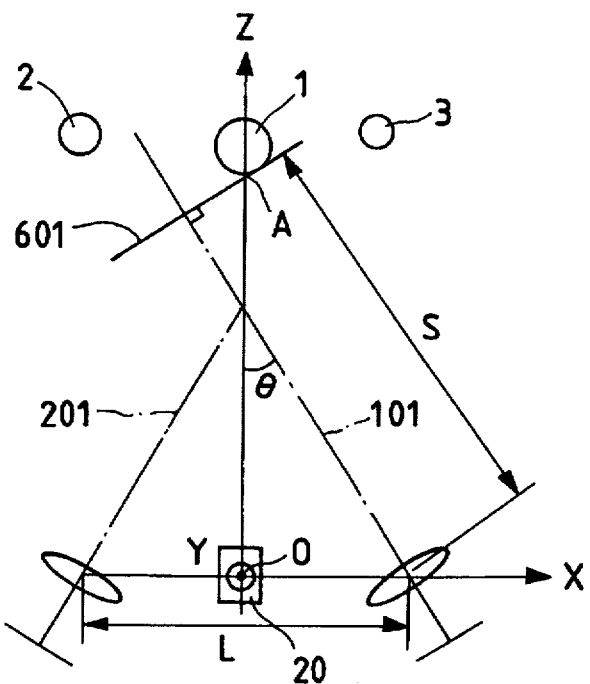
FIG. 14 is an explanatory view for obtaining the set position of an in-focus object plane.

Referring to FIG. 14, an origin O is set at the midpoint of the base line length, and the X, Y, and Z coordinate axes are set as shown in FIG. 14. A distance z from the origin O to a point A on the object 1 is measured by the distance measuring means 20. As the distance measuring means 20, for example, a method can be used in which infrared light is projected on the object, and the distance to the object is obtained from the detection position of the reflected light. A distance S to the set position of an in-focus object plane 601 of an image pick-up optical system 102 is represented by the following equation.

$$S=(L/2)/\sin\theta+(z-(L/2)/\tan\theta)\cos\theta \quad (1)$$

where L: base line length.

The microcomputer 11 outputs signals for driving focusing motors 107 and 207 of image pick-up optical systems 102 and 202 on the basis of equation (1). With this operation, the image pick-up optical systems 102 and 202 output an image focused on the object 1.

Figure 15:
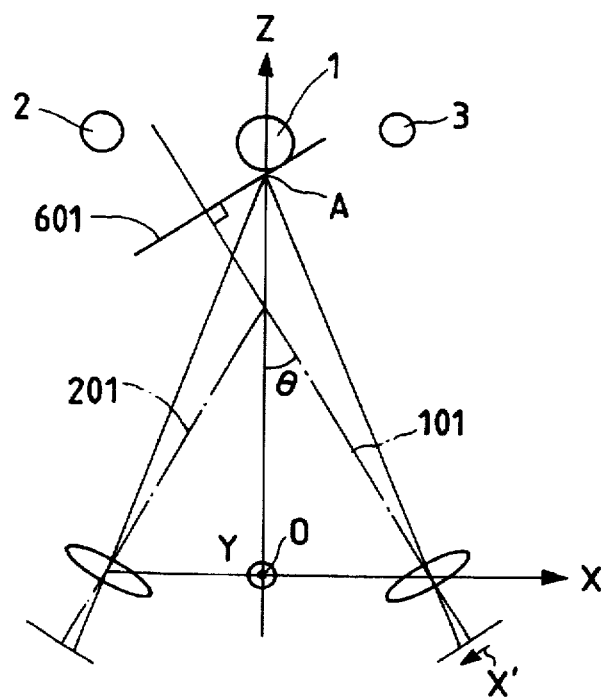
FIG. 15 is an explanatory view for obtaining the set position of an in-focus portion.
Figure 16A:
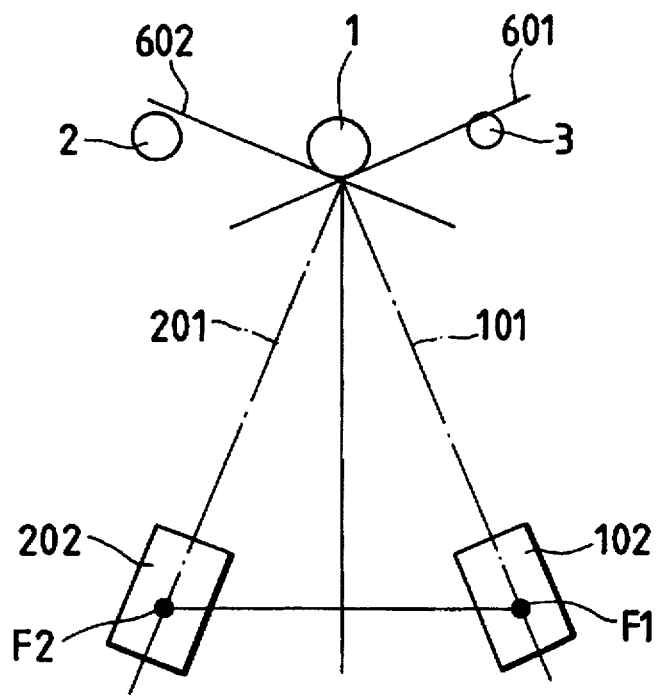
FIGS. 16A and 16B are views showing image pick-up conditions in a stereoscopic image pick-up mode and a finder screen image in a finder for displaying the in-focus portion, respectively.
Figure 16B:
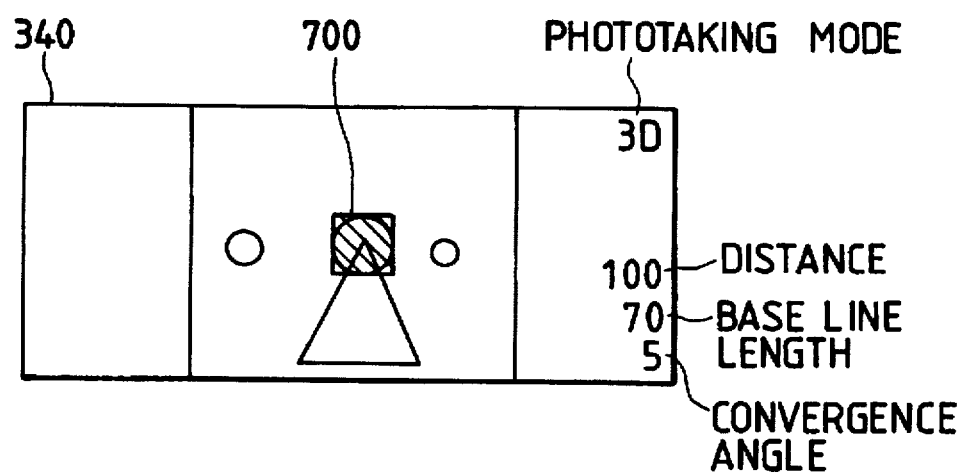
Figure 17A:
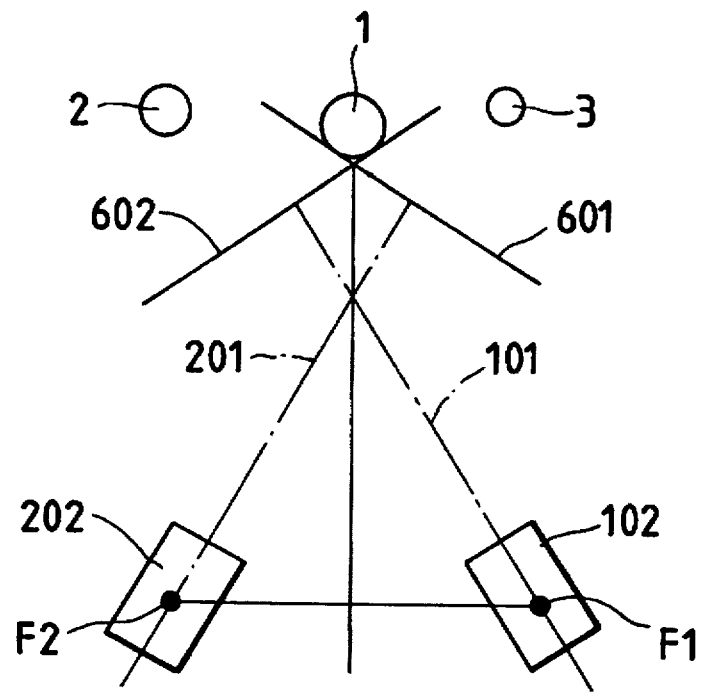
FIGS. 17A and 17B are views showing image pick-up conditions in the stereoscopic image pick-up mode and a finder screen image displaying the in-focus portion, respectively.
Figure 17B:
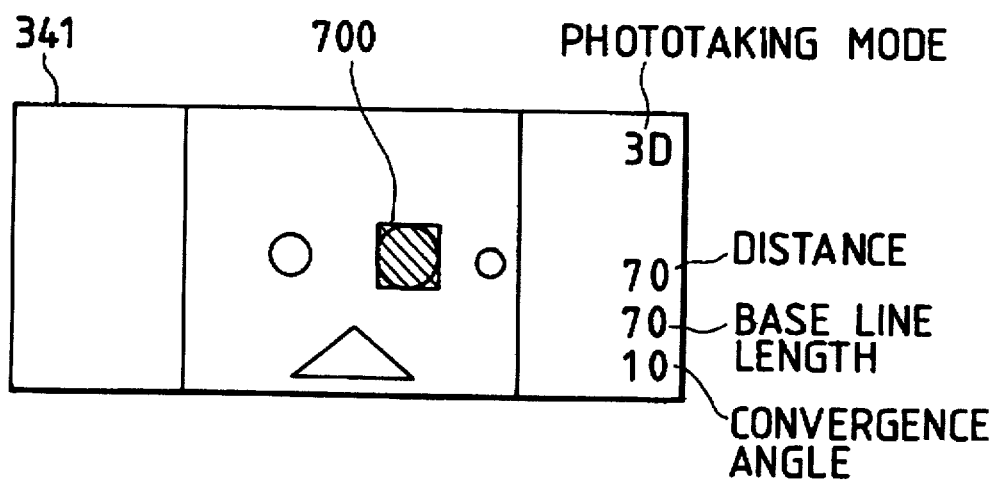
Figure 18A:
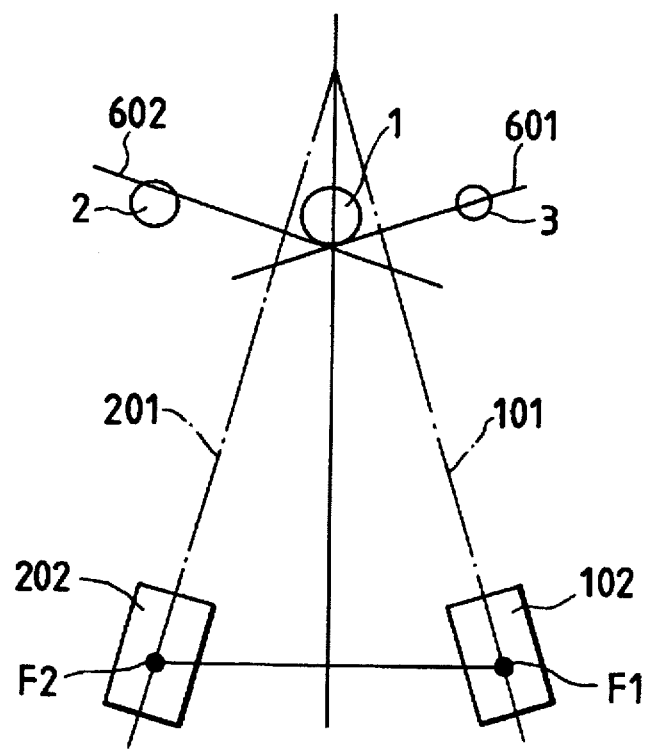
FIGS. 18A and 18B are views showing image pick-up conditions in the stereoscopic image pick-up mode and a finder screen image displaying the in-focus portion, respectively.
Figure 18B:
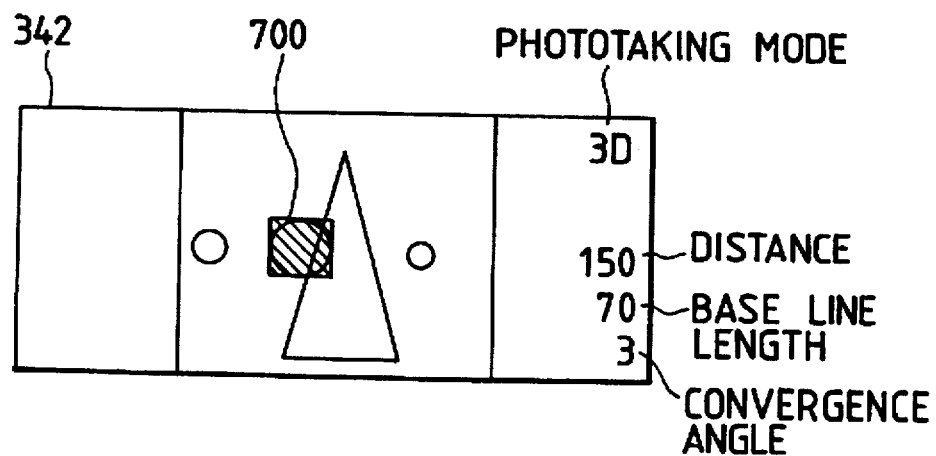
Figure 19A:
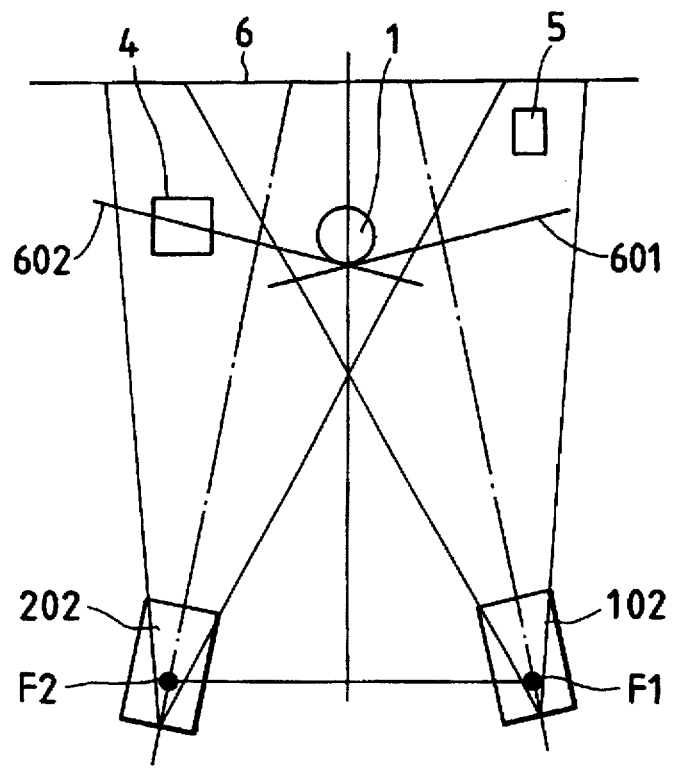
FIGS. 19A and 19B are views showing image pick-up conditions in an aspect ratio change/panoramic image pickup mode and a finder screen image displaying the in-focus portion, respectively.
Figure 19B:
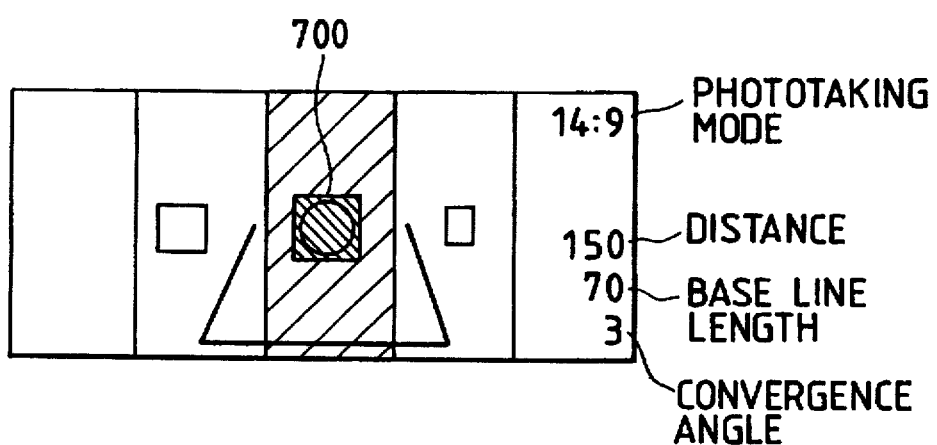

An in-focus portion 700 is displayed in a finder 15, as shown in FIG. 16B, 17B, or 18B. The display position of the in-focus portion 700 can be obtained as a focusing position in an image sensor at the point A, as shown in FIG. 15, by the following equation.

$$x'=(z-(L/2)/\tan\theta)\cdot\sin\theta\cdot\beta \quad (2)$$

where β: focusing magnification.

A finder screen image producing portion 14 receives each parameter of equation (2) from the microcomputer 11, determines the display position of the in-focus portion 700 in the finder, and outputs a display signal to the finder 15.

FIGS. 16A, 17A, and 18A are schematic views showing a case in which an image is picked up while the gazing point (point where the optical axes of the two systems cross each other) is changed to adjust the stereoscopic effect in the stereoscopic image pick-up mode. As the position of the gazing point is changed, in-focus object planes 601 and 602 are set in accordance with equation (1), thereby performing an image pick-up operation.

FIGS. 16B, 17B, and 18B are views showing the finder 15 in these image pick-up states. A case is shown in which an image input by the image pick-up optical system 102 is displayed in the finder 15. Referring to FIG. 16B, the distance to the gazing point along the optical axis of each image pick-up optical system is the same as that to the in-focus object plane 601, and the in-focus portion 700 is displayed at the center of the screen of the finder.

In FIG. 17B or 18B, as the position of the gazing point changes, the position of the in-focus portion 700 is moved in the horizontal direction in accordance with equation (2). With this operation, a photographer can pick up an image while recognizing the in-focus portion 700 in the screen together with the image pick-up state described in the above embodiments. Also in the aspect ratio change/panoramic image pick-up mode, the in-focus object plane is set as shown in FIGS. 9A and 9B, and the in-focus portion 700 is displayed, thereby performing the image pick-up operation.

Figure 20:
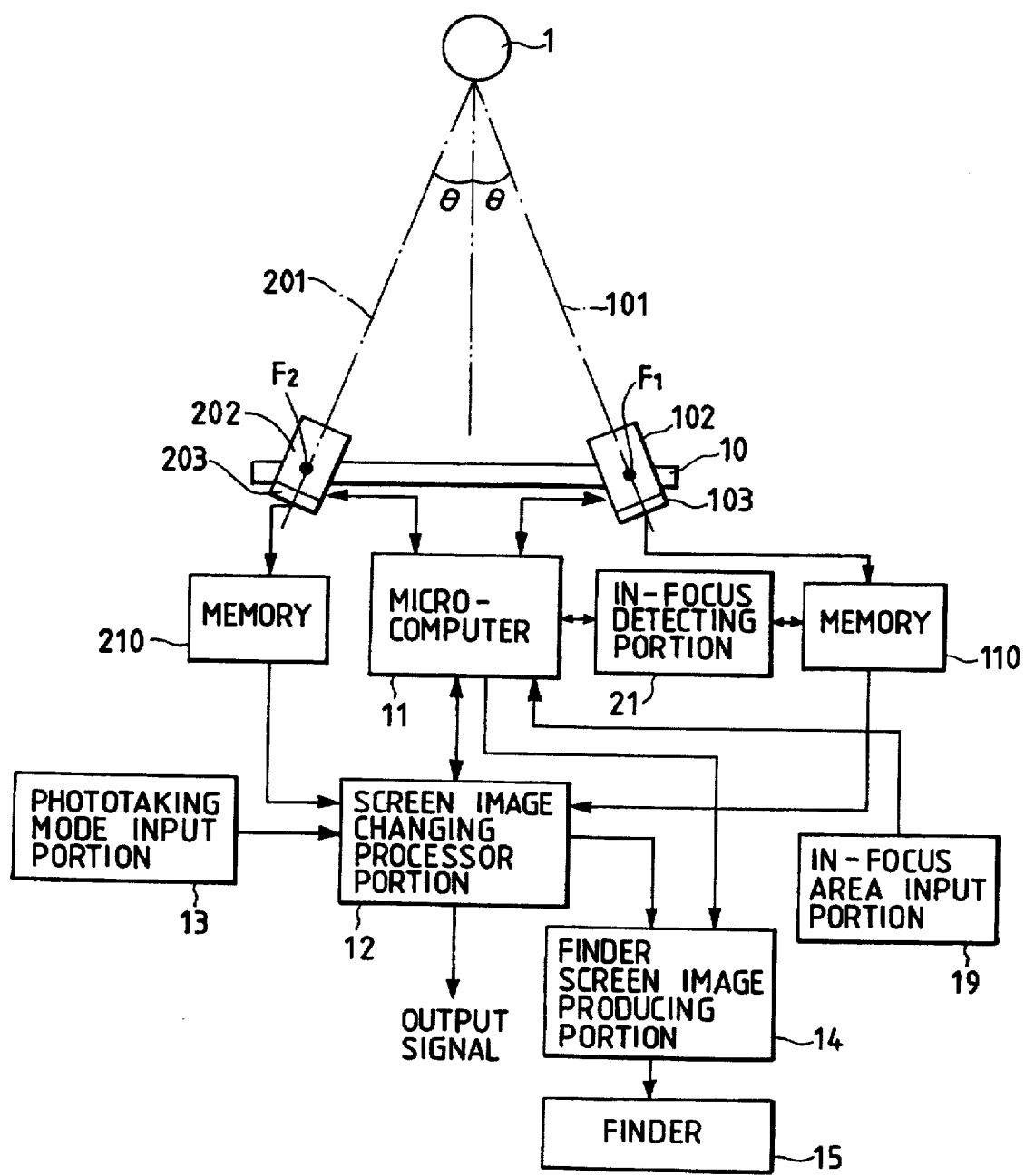
FIG. 20 is a schematic view showing a multi-eye image pick-up system according to the fourth embodiment of the present invention.

The fourth embodiment of the present invention will be described below. FIG. 20 is a schematic view showing a multi-eye image pick-up system according to the fourth embodiment. The same reference numerals and symbols as in the above embodiments denote the same portions, and a detailed description thereof will be omitted. In the third embodiment, the distance measuring means is provided to set the in-focus plane. However, this embodiment exemplifies a case in which a focusing operation is performed on the basis of an image signal. Referring to FIG. 20, an in-focus detecting portion 21 detects in-focus point from the image signal to set an in-focus object plane. An in-focus area input portion 19 externally inputs the set position of an in-focus portion 700.

A method of recognizing the in-focus object plane of this embodiment will be described with reference to FIG. 20. By an autofocusing mechanism, the focusing operation is performed at the gazing point of optical axes 101 and 102 in the initial state, as shown in FIG. 16A. An image input by an image pick-up optical system 102 is output to a memory 110, as shown in FIG. 20. An image signal in the in-focus portion 700 set at the central portion of the screen is extracted and output to the in-focus detecting portion 21. The in-focus detecting portion 21 detects the sharpness of the image, and drives the focusing motors such that the sharpness is maximized, thereby setting in-focus object planes 601 and 602.

As shown in FIG. 17A, when the gazing point is moved to a position in front of an object 1, a microcomputer 11 moves the in-focus portion 700 to the right side, as shown in FIG. 17B, on the basis of the change amount of the convergence angle and the image pick-up parameters of the image pick-up optical system 102, and outputs the image in this region to the in-focus detecting portion 21, thereby setting new in-focus object planes 601 and 602.

Figure 21A:
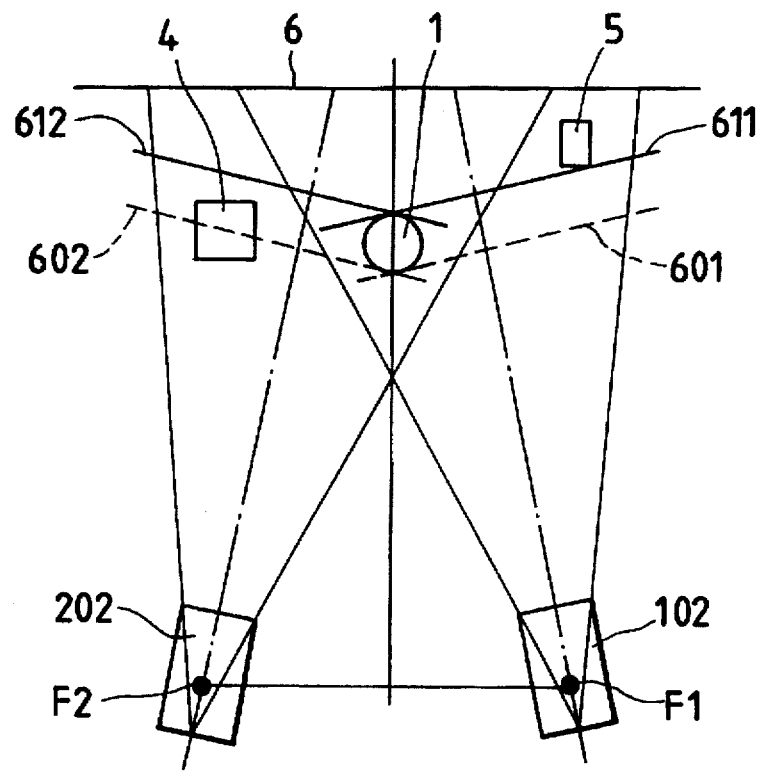
FIGS. 21A and 21B are explanatory views schematically showing an operation in an in-focus range input mode.
Figure 21B:
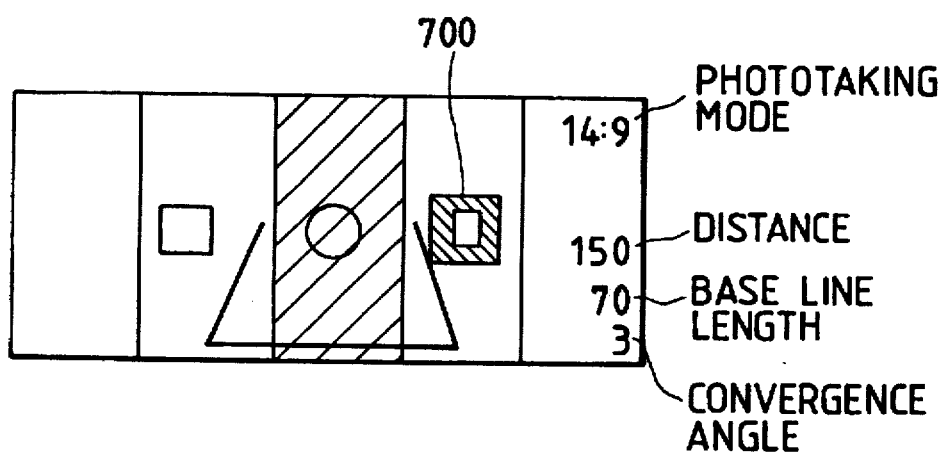

In another mode, the focusing operation can also be performed by externally inputting the set position of the in-focus portion 700 by the in-focus area input portion 19. As an example, setting of in-focus object planes 611 and 612 in the aspect ratio change/panoramic image pick-up mode is schematically shown in FIGS. 21A and 21B. As shown in FIG. 21B, when a photographer sets the position of the in-focus portion 700 by the in-focus area input portion 19, the in-focus object plane 601 is moved and set at the in-focus object plane 611, as shown in FIG. 21A. The in-focus object plane 602 is similarly set at the in-focus object plane 612. With this operation, the photographer can pick up an image while recognizing the position of the in-focus portion in the screen and inputting the set position of the in-focus portion, so that the operability and the quality of the image can be improved.

For descriptive convenience, a case has been described above in which only one image is displayed in the finder. However, by operating a switch (not shown), one of images may be selected and displayed. In addition, a multi-eye finder can also be used, as a matter of course.

The in-focus object planes 601 and 602 in the third and fourth embodiments are set at the same position in the image pick-up optical systems 102 and 202 by the microcomputer 11. Although the focusing operation has been described above, the same description apparently applies to setting and display of the photometric range.

In the above embodiments, information related to the image pick-up conditions can be displayed as needed, for example, only when the image pick-up conditions such as a convergence angle change, or the focusing mechanism is operated.

What is claimed is:

1. A multi-eye image pick-up apparatus comprising:
   a first image pick-up optical system;
   a second image pick-up optical system;
   a first image sensor for picking up an image by said first image pick-up optical system;
   a second image sensor for picking up an image by said second image pick-up optical system;
   convergence angle detecting means for detecting a convergence angle between said first and second image pick-up optical systems;
   display means for displaying at least one of images picked up by said first and second image sensors as a displaying image; and
   display controlling means for controlling display of said displaying means, wherein said display controlling means display a first display line and a second display line for indicating an optical axis of each of said first and second image pick-up optical systems and said display image and change an angle between said first and second display lines based on a detection signal of said convergence angle detecting means.

2. An apparatus according to claim 1,
   wherein said display controlling means display information as to said convergence angle as an information shown by a figure in said display means.

3. An apparatus according to claim 2,
   wherein said display controlling means change a shape of said figure displayed on said display means based on a signal of a convergence angle from said convergence angle detecting means when said convergence angle between said first and second image pick-up optical systems is changed.

4. An apparatus according to claim 2,
   wherein said display controlling means display said information as to said convergence angle as an information shown by a numerical value, also in said display means.

5. An apparatus according to claim 2 wherein said display controlling means overlap said figure onto said screen images picked up by said first and second image sensors to display it on said display means.

6. An apparatus according to claim 1, wherein said apparatus has a base line length detecting device which detects a base line length indicating a distance between said first and second image pick-up optical systems to output a signal of said base line length, and wherein said display controlling means display information relating to said base line length in said display means based on a signal of said base line length from said base line length detecting device.

7. An apparatus according to claim 6, wherein said display controlling means display said information relating to said base line length as an information shown by a figure in said display means.

8. An apparatus according to claim 7, wherein said display controlling means change a shape of said figure displayed on said display means based on a signal of a base line length from said base line length detecting device when said base line between said first and second image pick-up optical systems is changed.

9. An apparatus according to claim 7, wherein said display controlling means display an information relating to said base line length as an information shown by a numerical value, also in said display means.

10. An apparatus according to claim 7, wherein said display controlling means overlap said figure onto said screen images picked up by said first and second image sensors to display it in said display means.

11. An apparatus according to claim 1, wherein said apparatus has an image pick-up mode setting device for setting an image pick-up mode of said apparatus as a 3D image pick-up mode, and wherein said display controlling means display that the present mode is said 3D image pick-up mode in said display means when said 3D image pick-up mode is set by said image pick-up mode setting device.

12. An apparatus according to claim 1, wherein said apparatus has an image pick-up mode setting device for setting an image pick-up mode of said apparatus as a panorama image pick-up mode, and wherein said display controlling means display that the present mode is said panorama image pick-up mode in said display means when said panorama image pick-up mode is set by said image pick-up mode setting device.

13. An apparatus according to claim 1, wherein said apparatus has an image pick-up mode setting device for setting an image pick-up mode of said apparatus as an aspect-ratio changing image pick-up mode, and wherein said display controlling means display that the present mode is said aspect ratio changing image pick-up mode in said display means when said aspect-ratio changing image pick-up mode is set.

14. An apparatus according to claim 1, wherein said apparatus has a distance information detecting device for detecting information relating to a distance from at least one of said first and second image pick-up optical systems to an object to output a signal of said information relating to said distance, and wherein said display controlling means overlap an area regarded as an object to be detected by said distance information detecting device onto screen images picked up by said first and second image sensors to display it in said display means.

15. An apparatus according to claim 14, wherein said display controlling means display an information relating to a distance in said display means based on a signal of said information relating to said distance from said distance information detecting device.

16. An apparatus according to claim 1 further comprising base line length detecting means for detecting a length of base line between said first and second image pickup optical systems, wherein said display controlling means display a third display line for indicating said base line and said display image onto said display means and change a length of said third display line based on said detection signal of said base line length detecting means, and wherein said first display line is displayed, defining an end of said third display line as a base point and said second display line is displayed, defining the other end of said third display line as a base point.

17. An apparatus according to claim 16, wherein said display controlling means display a marker on a vertical bisector of said base line and said display image and change a position of said marker based on said detection signal of said convergence angle detecting means.

18. An apparatus according to claim 17 further comprising an in-focus state detecting means for detecting an in-focus state against a position of an objected field indicated by said markers of said first and second image pick-up optical systems and focus controlling means for controlling focus of said first and second image pick-up optical systems based on an output of said in-focus state detecting means.

19. An apparatus according to claim 1 further comprising overlapped area detecting means for detecting an overlapped area of images picked up by each of said first and second image sensors, wherein said display controlling means expressingly display said overlapped area onto said displaying means.

* * * * *